(12) United States Patent
Nielsen

(10) Patent No.: US 7,926,371 B2
(45) Date of Patent: Apr. 19, 2011

(54) LINEAR ACTUATOR FOR A PIECE OF FURNITURE

(75) Inventor: Jens J. Nielsen, Broager (DK)

(73) Assignee: Linak A/S, Nordborg (DK)

( * ) Notice: Subject to any disclaimer, the term of this patent is extended or adjusted under 35 U.S.C. 154(b) by 140 days.

(21) Appl. No.: 12/226,009

(22) PCT Filed: Apr. 4, 2007

(86) PCT No.: PCT/DK2007/000172
§ 371 (c)(1),
(2), (4) Date: Oct. 3, 2008

(87) PCT Pub. No.: WO2007/112755
PCT Pub. Date: Oct. 11, 2007

(65) Prior Publication Data
US 2009/0044340 A1    Feb. 19, 2009

(30) Foreign Application Priority Data

Apr. 5, 2006   (DK) ................................ 2006 00487

(51) Int. Cl.
*F16H 25/18* (2006.01)
*F16H 25/24* (2006.01)
*A47C 20/08* (2006.01)
*A47C 20/04* (2006.01)

(52) U.S. Cl. ..................... 74/89.32; 74/89.23; 74/89.35; 5/616

(58) Field of Classification Search .............. 310/80, 310/89; 5/616, 618; 74/89.23–89.45
See application file for complete search history.

(56) References Cited

U.S. PATENT DOCUMENTS

| | | | | |
|---|---|---|---|---|
| 5,075,911 A * | 12/1991 | Dewert | ............................. | 5/616 |
| 5,444,339 A * | 8/1995 | Domel et al. | ................... | 318/17 |
| 5,675,849 A * | 10/1997 | Koch | ................................ | 5/616 |
| 5,895,992 A * | 4/1999 | Dreher | ............................. | 310/80 |
| 6,300,732 B1 * | 10/2001 | Brambilla | ........................ | 318/9 |
| 6,377,010 B1 * | 4/2002 | Roither | ........................ | 318/560 |
| 6,679,555 B2 * | 1/2004 | Bangert | ........................ | 297/316 |
| 6,879,073 B2 * | 4/2005 | Roither et al. | ................... | 310/89 |

(Continued)

FOREIGN PATENT DOCUMENTS

| | | |
|---|---|---|
| DE | 202004007549 | 10/2004 |
| DE | 202004013071 | 11/2004 |
| WO | 2005112709 A1 * | 12/2005 |
| WO | 2005122840 | 12/2005 |

*Primary Examiner* — Burton Mullins
(74) *Attorney, Agent, or Firm* — Dykema Gossett PLLC

(57) ABSTRACT

A linear actuator for a piece of furniture, namely a bed or chair comprising a housing (8) of plastic consisting of two parts (8a, 8b) with a joining edge (8c) in the longitudinal direction of the housing. In both ends of the housing there is a transverse through aperture (10) for receiving a pivot shaft in the piece of furniture, and with an openable cover (9) for mounting the actuator on the shafts. In connection with the apertures there is a drive comprising a reversible motor, which over a transmission drives a spindle, and where a spindle nut fixed against rotation and constructed as a sliding element is mounted on said spindle. The pivot shaft in the piece of furniture has an arm which rests loosely against the end of the spindle nut when the actuator is mounted on the piece of furniture so that the pivot shaft is rotated for raising of a section in the piece of furniture in one direction of movement of the spindle and for lowering the section under its weight in the other direction. The two parts of the housing (11a, 11b) are join together by gluing or welding, which simplifies the mounting and shape of the housing compared to the traditional assembly with screws.

7 Claims, 2 Drawing Sheets

U.S. PATENT DOCUMENTS

| | | |
|---|---|---|
| 6,927,335 B2 * | 8/2005 | Lim et al. .................. 174/50 |
| 2002/0036421 A1 | 3/2002 | Bangert |
| 2004/0093969 A1 | 5/2004 | Nielsen |
| 2007/0285035 A1 * | 12/2007 | Roither et al. ................ 318/120 |
| 2008/0271246 A1 * | 11/2008 | Nielsen et al. .................... 5/616 |
| 2009/0151490 A1 * | 6/2009 | Kristensen .................. 74/89.37 |

* cited by examiner

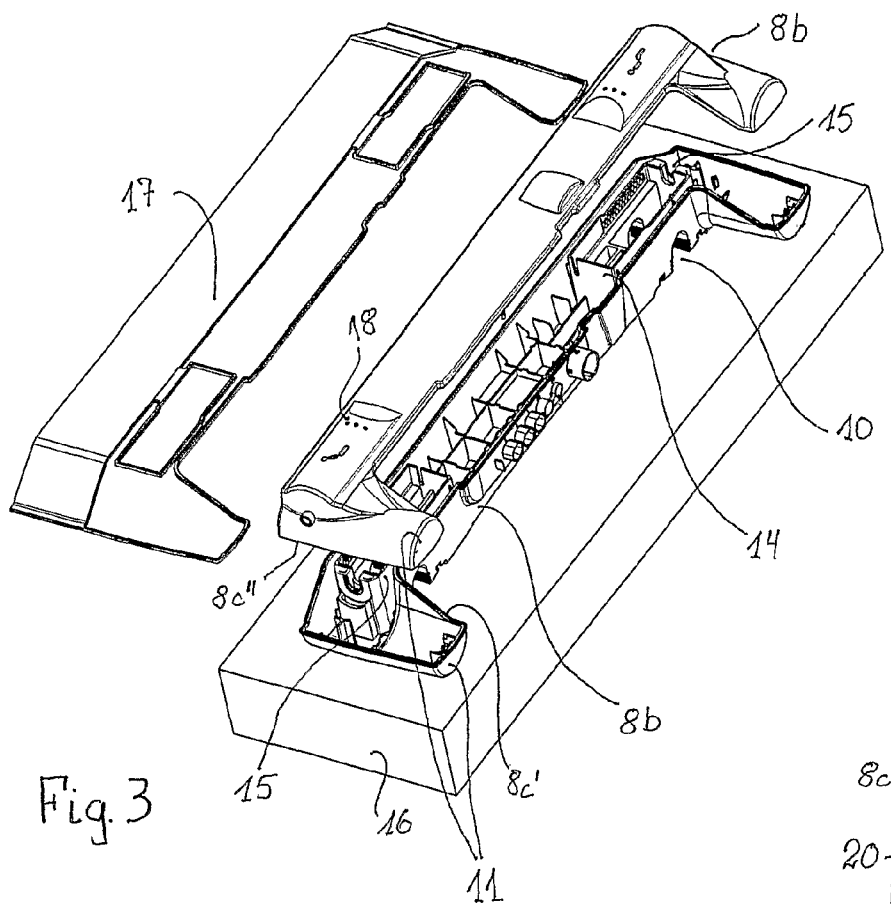
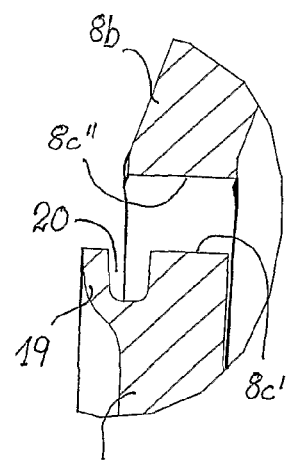
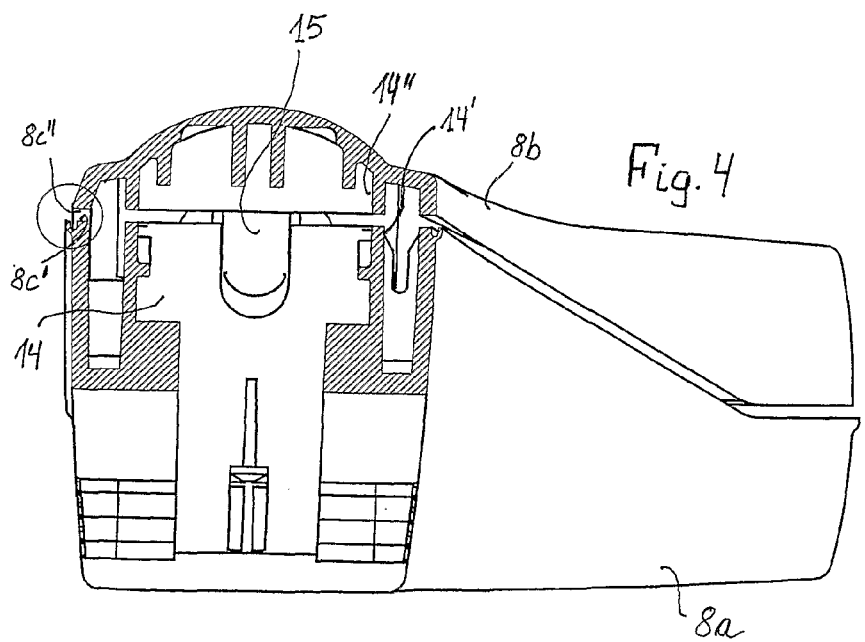

LINEAR ACTUATOR FOR A PIECE OF FURNITURE

BACKGROUND OF THE INVENTION

1. Field of the Invention

The present invention relates to a linear actuator for beds or chairs.

2. The Prior Art

Such actuators are by now well-known for beds with an adjustable upper body and leg section, and have developed into an actual low-cost product for the home bed market. However the actuators are also in a more sophisticated version used in care beds. As examples of such type of actuators could be referred to U.S. Pat. No. 5,075,911 Dewert, U.S. Pat. No. 6,300,732 B1 Compact S.r.l., DE 100 47 037 C1. In said actuators there is a drive in each end driven by their own motor. In the example WO 2005/122840 A1, Linak there is only one motor. An example for operating one section only is shown in DE 20 2004 007 549 U1 Dewert. The housing is typically constructed as two plastic shells, and the various components are mounted in one of the plastic shells and the other is screwed onto this with a considerable number of screws. The housing is relatively heavy loaded particularly in the area around the shaft aperture. In order to create sufficient strength it is a requirement that both plastic shells jointly operate as a strength element, hence the many screws. It is not unusual to use more than twenty screws. During the assembly process it is difficult with so many screws, which even need to be screwed in with precision. Moreover the large number of screws should also be taken into consideration when designing the plastic shells, which again complicates the mould tools and the moulding itself.

The object of the invention is to provide an actuator, which complies with the outlined assembly problem and at the same time does not render the actuator more expensive.

SUMMARY OF THE INVENTION

This is achieved according to the invention by designing the actuator to have two plastic shells of the housing joined by means of gluing or welding so that screws can be completely or partially avoided. For one thing this eases the assembly process and for another the mould tools can be simplified, and in that way a better moulding can be obtained. Welding or gluing is possible due to the fact that the welding or gluing is made continuous or in essential uninterrupted all the way around along the joining line of the two plastic shells. It is this full welding or gluing which makes it possible to do without screws, as the welding/gluing makes the two plastic shells appear as a unit, where the screws on the other hand are scattered no matter how many are used. By welding/gluing a more even transmission of forces between the two plastic shells is obtained, and even though it locally should not be as strong as when using a screw the force distribution nevertheless makes use of welding/gluing possible.

Among the welding processes heat welding is preferred as it is suitable for large items and the welding zone is broad on the other hand the welding equipment is rather expensive. Especially IR-welding has proven suitable. Ultrasound welding could also be used, the welding equipment is not so expensive however there is a limit to the size of the items. A further possibility is vibration welding which could handle large items, but the equipment is rather expensive and thereto noisy in used. Also an axial movement of the items should be, taken into consideration. Laser welding requires special types of plastic materials and only smaller items could be welded by this method.

As to gluing the manufactures of the various plastic materials provides information of suitable glues for the particular type of plastic materials or can refer to manufactures of glue materials. A suitable gluing material could normally be found among hot melt adhesives.

Welding/gluing is easier and more advantageous to automate than a joint with as large a number of screws as is required. With automation an accurate and coherent uninterrupted welding/gluing can be obtained.

To conceal irregularity such as a bead of melted material or leaking glue in the joint between the two parts of the housing the joining edge of one of the parts of the housing could be made such that it projects over the joining edge of the other part. Further a grove could be made in the joining edge, said grove reaching a distance under the other joining edge such that melted material from the welding process or glue is caught in this groove.

Dust and moisture is also an issue e.g. care beds are washed and disinfected between each occupant. Welding and gluing renders the housing dust and moisture proof except for the through aperture for the pivot axis. To solve this problem the spindle nut and part of the spindle are located in a separate compartment in one of the parts of the housing and that the compartment has a wall, the top of which is also welded/glued to the other part of the housing. Accordingly dust and moisture are in essential prevented from penetrating further into the housing. Moisture penetrated in the compartment could be drained making a least one drainage hole in the compartment, preferably at the lowest place in the mounted state of the actuator.

An embodiment of the invention will be explained in greater detail in the following with reference to the accompanying drawings.

BRIEF DESCRIPTION OF THE DRAWINGS

FIG. 3 shows a schematically perspective view of a heat welding tool with an actuator ready for assembly, FIG. 4 is a cross sectional view of the actuator, and FIG. 5 is a detailed view of the joining edges in the actuator housing.

DETAILED DESCRIPTION OF THE PREFERRED EMBODIMENT

Figure 1:
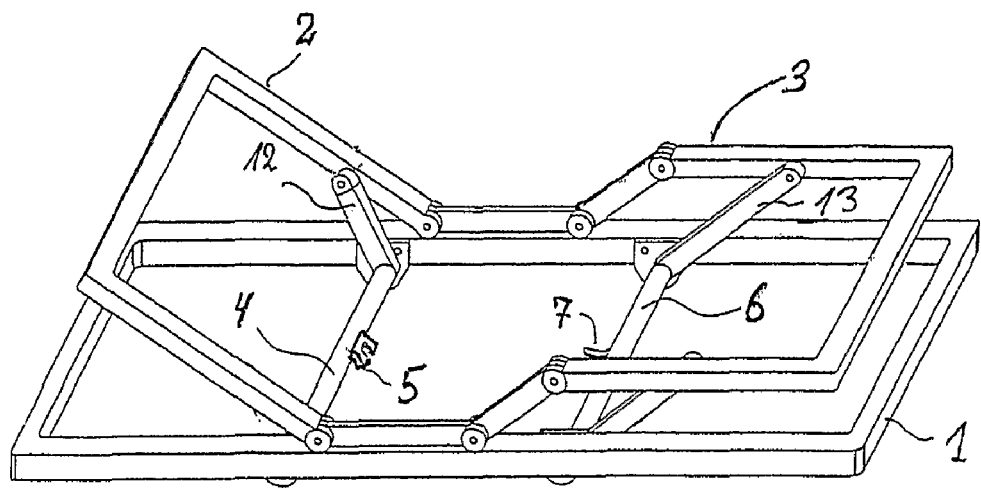
FIG. 1 shows a slatted bed with raised upper body and leg section.

As it appears from FIG. 1 the slatted bed comprises a frame 1, in which an upper body section 2 and an articulated leg section 3 is embedded. For the upper body section 2 a transverse pivot shaft 4 with a short arm 5 fixed onto it, is embedded in the frame 1. On each end of the pivot shaft is mounted a rod 12, connected to the upper body section. Correspondingly, there is a pivot shaft 6 with a short arm 7 for the leg section 3. Likewise, there is a rod 13 connected to the leg section 3 on the end of the shaft 6.

Figure 2:
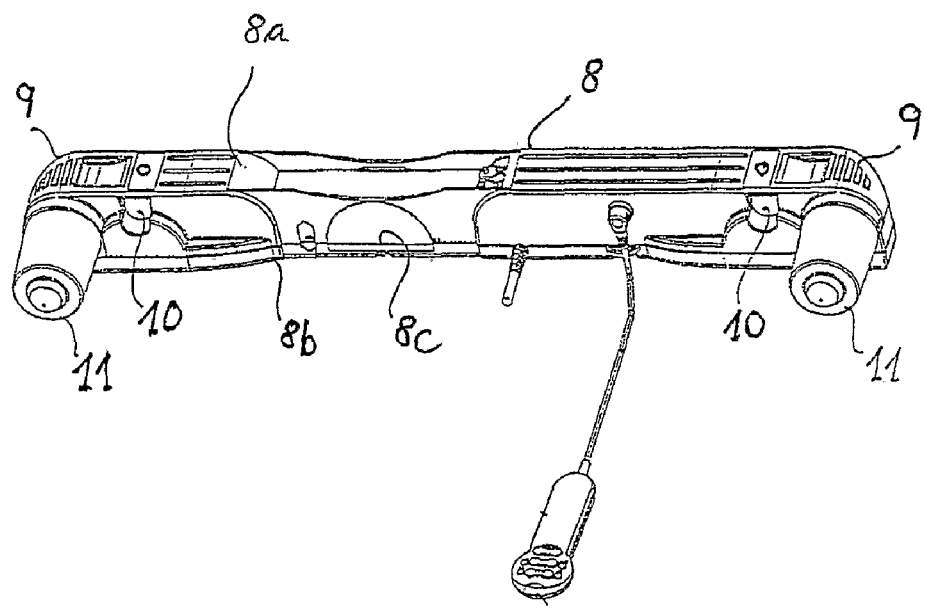
FIG. 2 shows a perspective view of a linear dual actuator.

The movement of the upper body and the leg section 2,3 is obtained with a dual actuator as shown in FIG. 2. The actuator comprises a housing 8, with a sliding cover 9 at each end giving access to a through aperture 10 for the respective pivot shafts 4,6. In connection with the through apertures 10 there is a drive driven by a low-voltage DC motor 11, mounted perpendicular to the housing. Over a worm gear, the motor 11 drives a spindle with a spindle nut shaped as a sliding element.

The spindle nut is fixed against rotation in the housing and by rotation of the spindle the spindle nut is moved back and forth depending on the rotary direction of the spindle. As the arm 5 on the pivot shaft 4 of the upper body section 2 engages the end of the spindle nut, the upper body section is pivoted up and down, respectively. Correspondingly, the drive in the other end of the actuator operates the leg section.

The housing is designed as a casing part 8a, in which all the parts are mounted and afterwards is closed by means of a base part 8b, which is welded onto the casing 8a.

In FIG. 3 is shown a schematically perspective view of a heat welding tool with an actuator ready for assembly. It should be noted that the actuator shown has a slightly different design than that shown in FIG. 2. For illustrative purpose the casing part 8a is shown empty, otherwise at this stage all the components would have been arranged in the casing part 8a. The spindle nuts would have been located in the respective compartments 14 and the spindles reach into the compartment through the incision 15. The wall 14' of the compartment has a height such that the other part 8b of the housing rests with a mating wall 14" on top of it. The casing part 8a is shown located in a fixture 16 in an IR welding machine. A heating tool 17 with heating elements 17a is movable into the gap between the spaced apart casing part 8a and base part 8b of the housing with the heating elements 17a located facing the joining edges 8c',8c" and the top of the wall of the compartments 14 and heats up the material by heat radiation without coming in actual contact with the edges. The heating tool is thereafter retracted sideways and the base part 8b of the housing is with its joining edge squeezed against the casing part 8a. Accordingly, the casing part 8a and the base part 8b are welded together with a continuous and uninterrupted welding seam. Additionally, the base part 8b is also welded to the compartments 14 in the casing part 8a giving additional strength and rigidness to the housing. Welding of the compartment 14 to the base part 8b also provides a dust and moisture proofing in the area of the through aperture 10 for the pivot shafts, thereby preventing dust and moisture from penetrating further into the actuator. In case moisture should leak into the compartment, leak holes 18 are provided. When mounted the actuator is turned up-side down compared with its position in the welding machine such that the leak holes 18 are located lower most.

When the joining edge 8c' is melted by the heating tool 17 this causes a bead of melted material at the exterior of the actuator especially when the base part 8b is squeezed onto the casing part 8a. To catch and conceal this bead the joining edge 8c' is shaped with a rim 19 protruding from the exterior side wall of the casing part 8a and in the rim there is longitudinal groove 20 extending a distance under the joining edge 8c" of the upper part 8a.

The actuator is mounted on the slatted bed by opening the covers 9, and leading the actuator in until the pivot shafts 4,6 rest in the through apertures 10 and the front ends of the arms 5,7 located in the movement path of the respective spindle nuts. The covers 9 are shut again, by means of which the actuator hangs on the pivots shafts 4,6. When the drives are activated, the pivot shafts are rotated, which causes the upper body and the leg section respectively to be raised or lowered.

The invention claimed is:

1. A linear actuator for raising and lower separate sections of an item of furniture, said linear actuator comprising an elongated plastic housing formed of separate casing and base sections, said casing section including internal walls that define respective internal compartments at opposite ends thereof, and respective outwardly-open transverse apertures which extend therethrough and through said respective compartments, said compartments containing respective spindle nuts which are linearly movable therein by rotation of respective spindles that extend in said compartments and which are rotated by respective motors mounted at the ends of the housing, said nuts moving arms attached to respective pivot shafts of the separate sections of the item of furniture and which are positioned in the respective outwardly-open apertures, and said base section is continuously welded or glued to the casing section and to the side walls of the compartments along joining edges.

2. The linear actuator according to claim 1, including a respective closeable cover which covers each outwardly-open transverse aperture.

3. The linear actuator according to claim 1, wherein the casing and base sections of the housing are two half-shells.

4. The linear actuator according to claim 3, wherein the case section and base section are heat welded together.

5. The linear actuator according to claim 1, wherein a joining edge of one of the casing and base sections projects over a joining edge of another of the casing and base sections.

6. The linear actuator according to claim 5, including a groove in the joining edge of the one section which extends a distance under the joining edge of another section.

7. The linear actuator according to claim 1, including at least one drainage hole for each compartment.

\* \* \* \* \*